United States Patent [19]

Sattmann

[11] Patent Number: 4,872,269
[45] Date of Patent: Oct. 10, 1989

[54] AUTOMATIC CYLINDER PROFILING GAGE

[76] Inventor: Karl Sattmann, 941 Viewland, Rochester Hills, Mich. 48064

[21] Appl. No.: 179,261

[22] Filed: Apr. 8, 1988

[51] Int. Cl.$^4$ .............................................. G01B 7/12
[52] U.S. Cl. ....................................... 33/552; 33/542; 33/827; 33/544
[58] Field of Search ............. 33/147 K, 178 E, 178 F, 33/542, 543, 544, 552, 553, 554, 827

[56] References Cited

U.S. PATENT DOCUMENTS

| | | | |
|---|---|---|---|
| 2,150,070 | 3/1939 | Kregecz | 33/178 E X |
| 2,659,157 | 11/1953 | Aller | 33/178 P |
| 2,799,944 | 7/1957 | McConnell | 33/147 K X |
| 3,024,651 | 3/1962 | McGlasson | 33/178 F X |
| 4,030,202 | 6/1977 | Fadl | 33/178 E |
| 4,625,795 | 12/1986 | Despax | 33/178 F X |

Primary Examiner—Harry N. Haroian
Attorney, Agent, or Firm—Krass and Young

[57] ABSTRACT

An automatic cylinder profiling gage system comprises a measuring head adapted to fit into a cylinder and including a number of transducers associated therewith, each transducer generating a positional signal corresponding to the distance from the head to the interior wall. The gage further includes a processor adapted to receive the signals, compare them with stored data indicative of the profile of an ideal cylinder so as to determine deviation therefrom. The system is further adapted to provide a visual display of data relating to cylinder profile. The gage system may further include calibration means as well as particular computer programs for processing information generated thereby to provide statistical or other information.

19 Claims, 4 Drawing Sheets

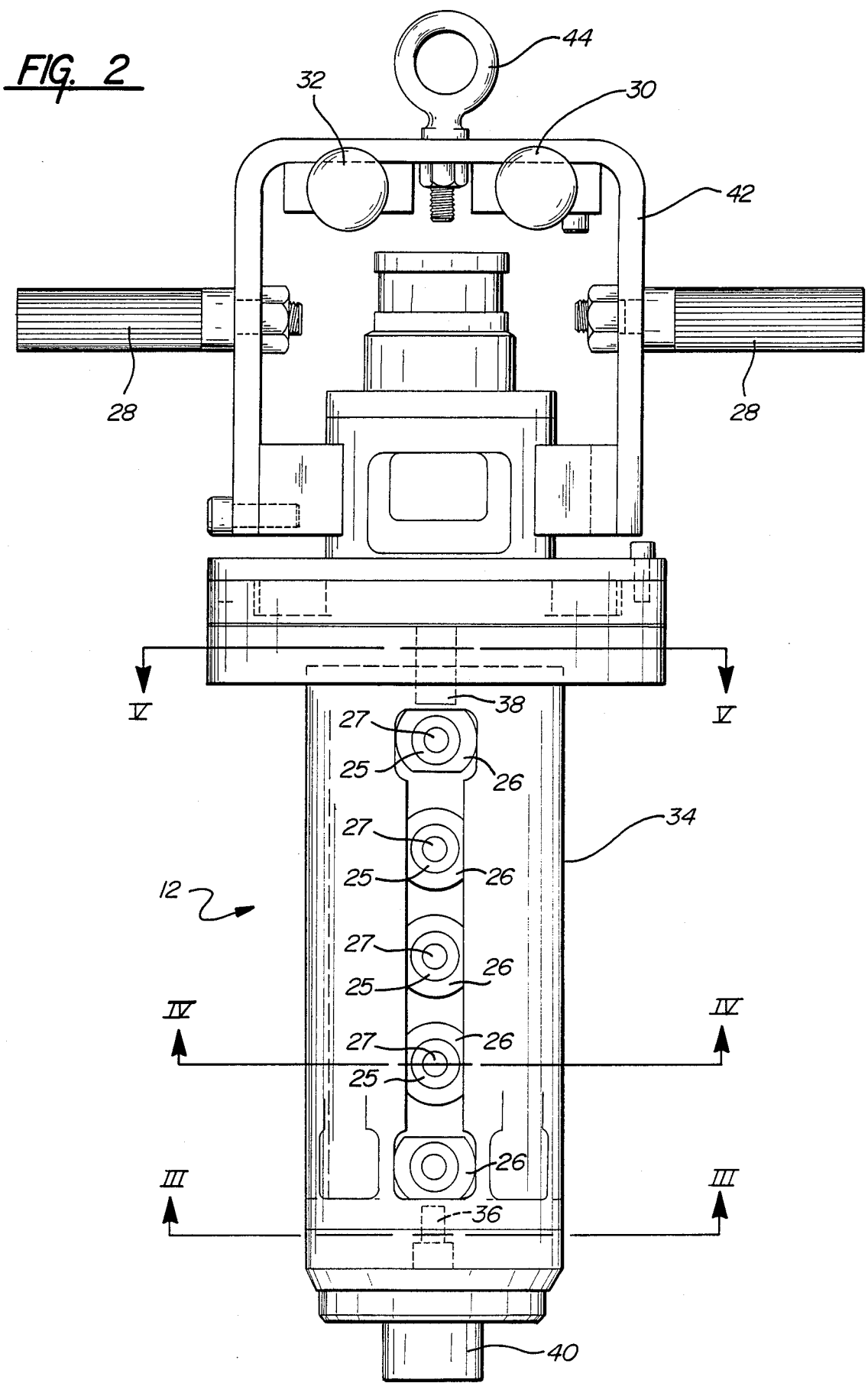

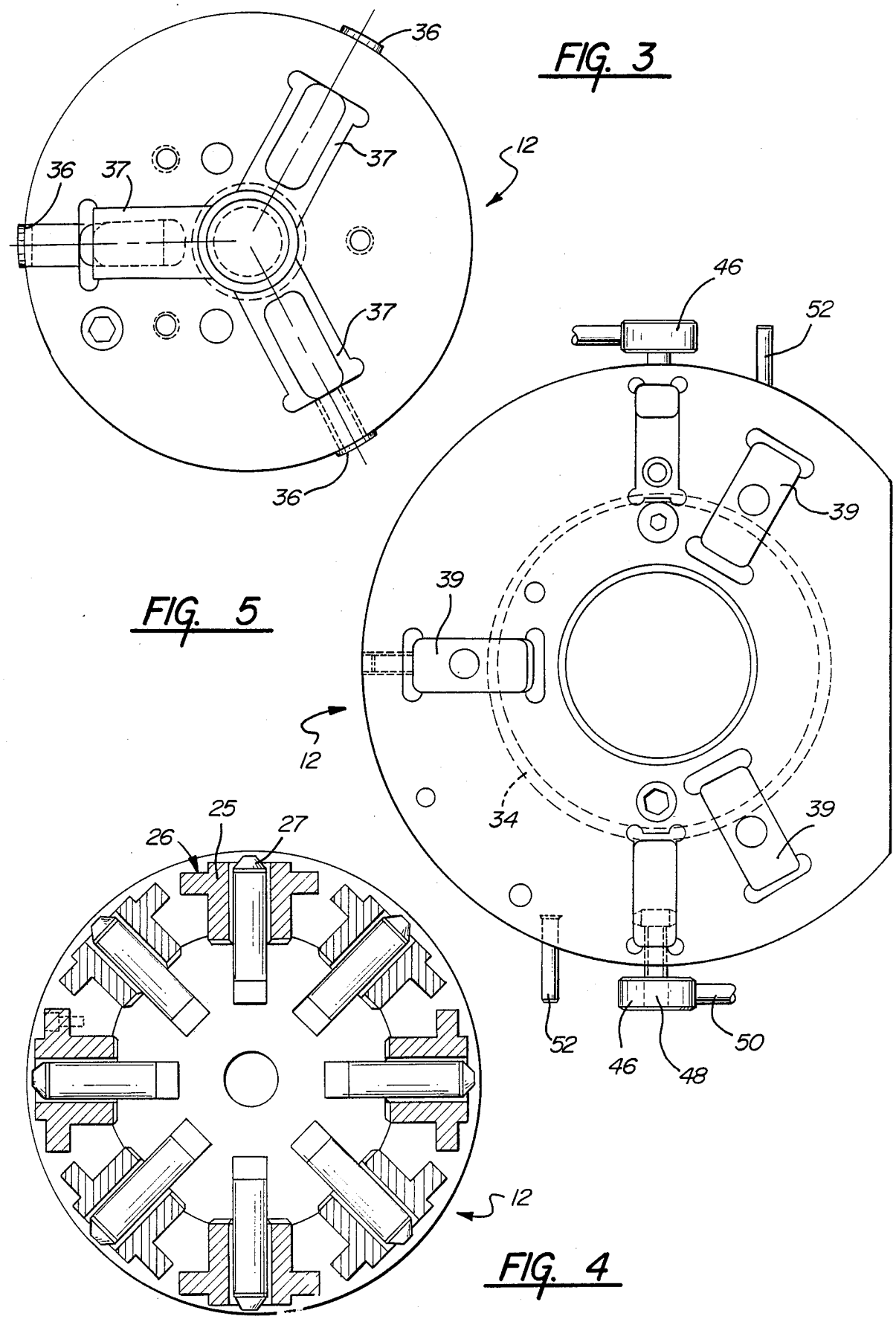

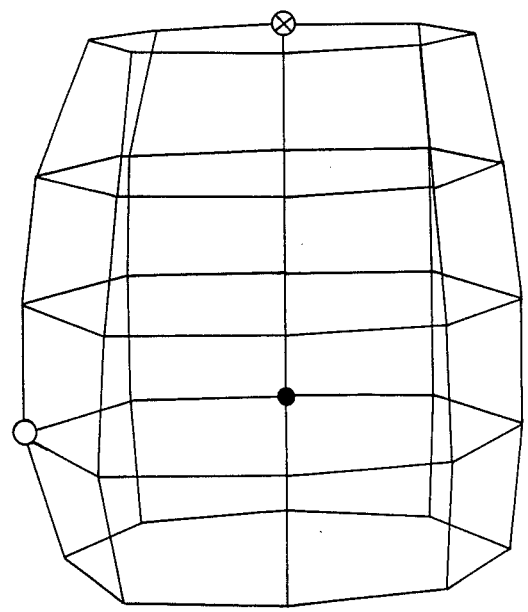
FIG. 6
FIG. 7
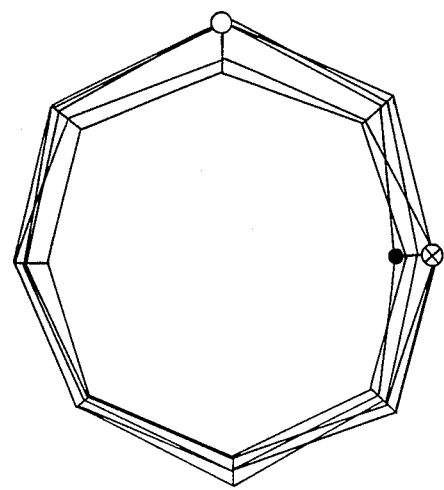

AUTOMATIC CYLINDER PROFILING GAGE

FIELD OF THE INVENTION

This invention relates generally to measuring devices and particularly to a gage for profiling the interior diameter of a cylinder and most particularly to a gage for the one step profiling of a plurality of points on the interior surface of a cylinder.

BACKGROUND OF THE INVENTION

Measuring operations are essential to any manufacturing process and are particularly critical in the mass production of precision machinery. In such processes, many measuring steps are employed to ensure proper dimensional tolerances of a part and to provide for interchangeability of mass produced parts. Additionally, measuring steps are necessary for quality control, monitoring of manufacturing errors and assessment of wear in tooling, dies and the like.

One measuring operation which is required in many manufacturing steps involves profiling. By profiling is meant the measurement of the three-dimensional shape of a part and as particularly employed herein, cylinder profiling refers to the profiling of the bore hole of a cylinder to assess various properties such as straightens, cylindricity, taper and the maximum and minimum radius thereof. Many types of pumps, internal combustion engines, compressors and similar devices employ pistons which travel in cylinders and the manufacture of such devices is dependent upon the profiling of these cylinders to ensure proper fit of the pistons therein.

Heretofore, profiling of cylinders was a painstaking, manual process accomplished by the use of micrometers, calipers, and the like. Various attempts at automation of such measurements involved the use of gages adapted to measure a single point or single tier of points in a cylinder. Use of such tooling necessitated making a repeated series of measurements as the measuring gage was drawn through the cylinder bore. Such techniques are generally slow and inaccurate insofar as the measuring gage can be displaced during subsequent measuring steps.

U.S. Pat. No. 4,407,071 discloses a device for measuring internal diameters of pipes and includes a plurality of feeler fingers disposed in a circular array to measure the diameter of a cylinder in a particular, single plane. Measurement of the diameter of the entire cylinder involves making repeated measurements while drawing the apparatus therethrough. U.S. Pat. No. 3,075,292 discloses a gage for measuring the diameter of a well casing. The gage of the '292 patent is essentially an electronic caliper which is drawn through the tubing to measure the diameter at particular levels therein. Use of apparatus similar to those described does allow for profiling of cylinders; however, the implementation of the techniques involved is slow and complex and requires precise positioning and repositioning of the measuring gage to obtain an accurate profile of a cylinder. Therefore, apparatus of this type is not at all suited to high volume automated production processes.

Through the use of a fast, simple and accurate cylinder profiling technique, manufacturers could maintain high levels of quality control in a large volume production process so as to produce quality products; additionally, use of such techniques would allow for ready monitoring of tooling and die wear so as to minimize maintenance and down time of equipment. Despite the advantages which attach to the use of high volume profiling, manufacturers have not readily adopted such techniques owing to the fact that presently available equipment is expensive, difficult to operate, and frequently of inadequate accuracy. It will thus be appreciated that there is a need for a cylinder profiling gage which is accurate, simple and easy to use. It is further desired that such apparatus be readily adaptable to automated production and quality control techniques.

The present invention provides for a cylinder profiling gage which accurately profiles an entire cylinder bore substantially instantaneously without necessitating repositioning of a measuring unit within the cylinder. Furthermore, the gage of the present invention may be readily utilized by an unskilled worker to provide highly accurate data. The output of the gage of the present invention may be displayed in an operator-readable graphic form providing for rapid visual identification of cylinder characteristics. The output of the gage may also be provided in numerical form, either as a human-readable output or as machine-readable data which may be processed in accord with various statistical quality control protocols. These and other advantages of the present invention will be readily apparent from the drawings, description, discussion and claims which follow.

SUMMARY OF THE INVENTION

There is disclosed herein an automatic cylinder profiling gage which comprises a generally cylindrical measuring head adapted to fit into a cylinder being profiled. The measuring head includes centering means for maintaining the head in an approximately centered relationship within the interior of the cylinder, a plurality of transducers associated with the head, each transducer including a measuring probe extensible from the surface of the head and adapted to generate a positional signal corresponding to the distance from the head to the interior wall of the cylinder. The transducers are disposed in spaced apart relationship so as to substantially simultaneously contact a plurality of points along the length and circumference of the cylinder wall. The gage further includes a signal processor disposed so as to receive the positional signals from the plurality of transducers, compare the signals with stored values corresponding to positional signals obtained from an ideal cylinder and generate a profile signal indicative of the deviation of the measured cylinder from the ideal cylinder. The gage still further includes display means in operative communication with the signal processor and adapted to receive the profile signal and provide a visual display corresponding thereto.

In particular embodiments, the transducers are arrayed in a plurality of levels spaced along the length of the cylinder measuring head, each level including a plurality of circumferentially spaced transducers. The transducers may comprise linear variable displacement transducers.

The processor may be further adapted to analyze the profile signal and compute at least one property of the cylinder from the group consisting of maximum radius, minimum radius, taper, cylindricity and straightness. The processor may be further adapted to store the profile signal from a series of measurements made upon a series of cylinders and provide a statistical analysis of those measurements.

The display may be adapted to receive the profile signal and provide a visual representation of a cylinder having a profile corresponding to the profile of the measured cylinder. The deviation of the measured cylinder from an ideal cylinder may be exaggerated in this display to accentuate the features thereof and the display may further include visual indicia showing maximum deviation, minimum deviation, zero deviation from an ideal cylinder. The gage may have provided therewith one or more calibration cylinders having a known profile for use in calibration of the gage.

Also included within the scope of the present invention is a method for profiling the bore of a cylinder.

BRIEF DESCRIPTION OF THE DRAWINGS

FIG. 2 is a front elevational view of one embodiment of measuring head structured in accordance with the principles disclosed herein;

FIG. 3 is a cross-sectional view of the measuring head of FIG. 2 taken along line III—III ;

FIG. 4 is a cross-sectional view of the measuring head of FIG. 2 taken along line IV—IV ;

FIG. 5 is a cross-sectional view of the measuring head of FIG. 2 taken along line V—V ;

FIG. 6 is a depiction of one particular display of the profile signal which may be provided in accord with the principles of the present invention; and FIG. 7 is a depiction of another display of profile signal which may be provided in accord with the principles disclosed herein.

DETAILED DESCRIPTION OF THE INVENTION

Figure 1:
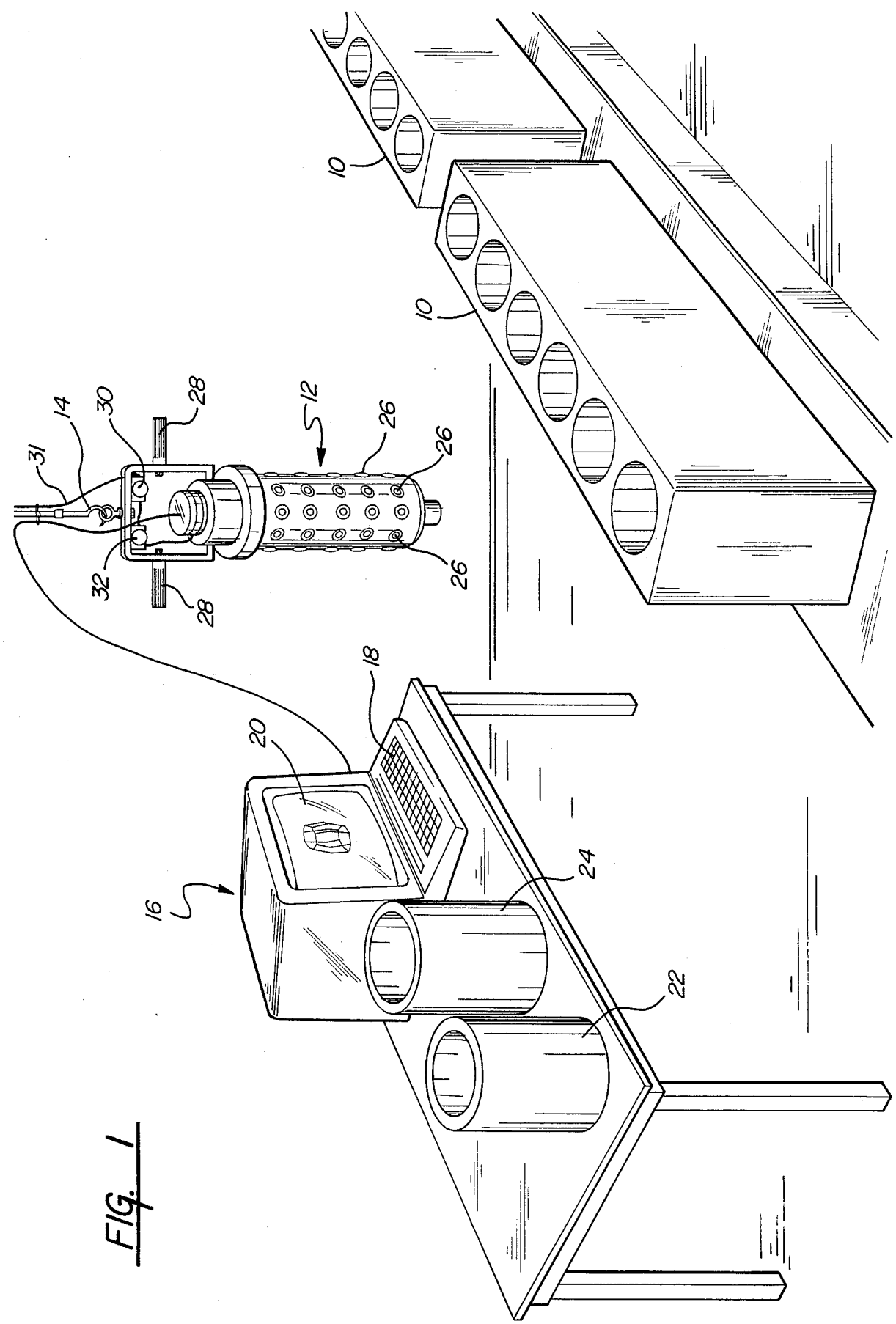
FIG. 1 is a perspective view illustrating one particular automatic cylinder profiling gage system as disposed in a production environment to profile a number of cylinders.

Referring now to FIG. 1 there is shown a perspective view of one particular installation of automatic cylinder profiling system structured in accord with the principles of the present invention and as disposed to profile the cylinders of a plurality of engine blocks 10. The system includes a measuring head 12, which suitably will be described in greater detail herein below, suitably suspended by a hook 14 attached to a crane, trolley or similar support system well known to those of skill in the art. The head 12 is in electrical communication with a signal processor, which in this instance is a computer 16 having a keyboard 18 for data entry and a cathode ray tube 20 for display of data. The depicted system includes two calibration cylinders 22 and 24 for standardization of the measuring head 12.

It will be noted from the figure that the measuring head 12 includes a plurality of transducers 26 associated therewith. These transducers are adapted to contact the interior wall of the cylinder being profiled and provide a signal corresponding to the distance from the measuring head 12 to the cylinder wall. The measuring head 12 further includes two handles 28 for positioning the head 12 within the cylinder. Also visible in the figure is a compressed air line 31 and a pair of operating buttons 30,32 whose function will be explained in greater detail herein below.

Figure 2 depicts the measuring head 12 in greater detail. The actual measuring portion of the head 12 comprises a cylinder 34 having a diameter less than the diameter of the cylinders being measured. Disposed upon the measuring head cylinder 34 are a plurality of positional transducers 26, of the type adapted to provide an electronic signal indicative of the distance from the measuring head 12 to the wall of a cylinder in which the head 12 is inserted. There are a great variety of transducers known and available to those of skill in the art which may be adapted for the present invention. Included therein are numerous types of positional transducers in which an extensible element contacts the wall of the cylinder being measured. One particular transducer have utility is a transducer of the type referred to as a linear voltage displacement transducer or "LVDT." Transducers of this type are well known to those of skill in the art and are able to provide highly accurate signals corresponding to their positional displacement. As depicted herein, such transducers generally comprise a plunger like member 27 retained by a collar 25. In operation, the plunger 27 is spring biased to project outward from the body of the transducer and its range of travel is restricted by the collar 25 so as to prevent loss. The plunger 27 contacts the wall of the cylinder being profiled and the transducers provide a voltage corresponding to the degree of projection of the plunger 27. Such transducers are well known to those of skill in the art and are available from a variety of sources. One particular transducer having utility is sold by the Sangamo Corporation under the Model Designation No.AGZ -0.5 (0.1% Lin.). Such transducers may be capable of providing a signal indicative of plunger travel of as little as 0.1 micron. It should be noted that in Figure 2 only 5 transducers are shown. This is for convenience of illustration and in actual use, the head 12 is provided with a plurality of transducers circumferentially arrayed about the measuring head cylinder 34. In one particular embodiment, the cylinder 34 has 40 transducers 26 arrayed thereupon in five tiers, each tier including eight transducers spaced at 45° increments about the circumference of the cylinder 34.

The measuring head 12 further includes two sets of clamping jaws for centering and retaining the measuring head cylinder 34 within the interior of the cylinder being measured. Such clamping means may comprise a set of equally spaced, pneumatically driven jaws and FIG. 2 depicts one jaw 36 of a lower set of clamping jaws and another jaw 38 of an upper set.

The measuring head 12 may further include a support base 40 adapted to retain the head 12 in spaced apart relationship from the bottom of the interior of a cylinder being profiled and this support base 40 may optionally be spring loaded to cushion the head upon insertion. It will also be noted from the figure that the forward end of the measuring head 12 is tapered to facilitate insertion into a cylinder.

The upper portion of the measuring head 12 includes a support frame 42 which may include an eye bolt 44 for attachment of the head 12 to a crane, trolley or similar support device. Attached to the support frame 42 are a pair of handles 28 for positioning and guiding the head 12 into a cylinder. Also disposed upon the support frame 42 are a pair of activating buttons 30,32. The first button 30 activates the centering and clamping jaws 36,38 thereby functioning to retain the measuring head 12 in a supported relationship within the cylinder. The second button 32 is operative to unclamp the support jaws. The clamping jaws may be electronically activated although it has been found most expedient to utilize pneumatically activated jaws and in this regard the buttons 30,32 will preferably be in communication with a compressed air line, (31 in FIG. 1 and not illustrated herein). Also not illustrated is a data link such as a cable or the like establishing electrical communication between the measuring head 12 and the signal processor.

Referring now to FIG. 3 there is shown a cross-sectional view of the measuring head 12 of FIG. 2 taken along line III—III. Visible in this figure are the lower clamping jaws 36 disposed to be activated by pneumatic cylinders 37 which operate the jaws upon control of the buttons 30,32.

FIG. 4 is a cross-sectional view of the measuring head 12, of FIG. 2, taken along line IV—IV and depicting in better detail the circumferential arrangement of transducers 26 and better showing the central plunger 27 and collar 25 thereof. It will be appreciated that each of the transducers 26 has associated therewith appropriate electrical circuitry well known to those of skill in the art to provide a signal corresponding to the projection of the plunger 27 therefrom.

Referring now to FIG. 5, there is shown a cross sectional view of the measuring head 12 of FIG. 2, taken along line V—V and illustrating the arrangement of pneumatic cylinders 39 associated with the clamping jaws (not visible in this view). Shown in phantom outline is the diameter of the measuring head cylinder 34. Clearly depicted in FIG. 5 are a pair of pivotably retractable supports 46 for retaining the measuring head 12 in fixed relationship with the interior of a cylinder being measured prior to activation of the clamping jaws 36,38. The retractable supports 46, each generally comprise a wheel like member having an eccentric central axle 48. Each wheel like member also includes a handle 50 radially attached thereto. It will be appreciated that by rotating the wheel like member about the axle 48, the circumference of the wheel is brought closer to or farther from a subjacent surface. In use, the support 46 is rotated so as to position the bottom most portion of the circumference of the support 46 farthest from the axle 48. In this context it should be noted that by bottom most is meant the portion closest to the article having a cylindrical cavity being profiled. In this manner, the circumferential surface forms a support point for the measuring head 12. For example, in the embodiment of FIG. 1, the circumferential portion of the support will rest upon the upper surface of the engine block 10.

Once the measuring head is positioned within the cylinder, the clamping button 30 is activated to center and rigidly retain the measuring head. At this point, the lever 50 associated with the support 46 is rotated to move the circumferential portion thereof away from the surface of the article being measured and toward that end, the measuring head includes a stop member 52 to restrain travel of the handle 50. Once these supports have been retracted, the measuring head 12 is retained in the cylinder solely by the centering and clamping jaws 36,38.

Operation of the profiling gage of the present invention will be explained with reference to the foregoing figures, particularly with reference to FIG. 1. In a typical operational mode, the system software associated with the signal processing computer 16 will direct the operation of the gage in a menu driven mode. The gauging system is first activated by turning on the computer 16, at which time the computer 16 will carry out self-diagnostic checks of computing circuitry and transducers. A source of compressed air is provided to the measuring head 12 for operation of the clamping jaws and as per menu direction, the head 12 is preferably first calibrated before use.

One or both of the calibrations cylinders 22,24 may be employed for this purpose. The calibration cylinders are of a known interior profile as determined by measurement with calipers, or other such means, and it should be noted that these cylinders need not be "perfect," provided their profiles be accurately known. Stored within the memory of the computer 16 is data relating to the profile characteristics of the calibration cylinders 22,24. It is preferable that the two calibration cylinders 22,24 be of different nominal interior diameter so as to permit for two point calibration of the measuring head, although it will be appreciated by one of skill in the art that single point calibration will suffice in many instances.

Calibration is carried out by placing the head 12 into a given calibration cylinder and measuring the profile thereof by means of the transducers. The transducers cooperate to provide a profiling signal which is a composite of the readings of all of the transducers and is indicative of the measured profile of the calibration cylinder. This profiling signal is compared with the stored value for the true profile of the cylinder and the transducers are appropriately calibrated to give an accurate reading. It should be noted in this regard that calibration is carried out internally by the processor which determines individual calibration factors to be added or subtracted to the reading of each transducer; therefore, no separate adjustment of transducers is necessary. The calibration process will also determine if a particular transducer is malfunctioning and can display an error signal on the screen of the computer so indicating.

After calibration with a first one of the standard cylinders is accomplished, it may be desirable to calibrate with a second cylinder so as to achieve two point calibration. As mentioned previously, the cylinders are of two different sizes corresponding roughly to the size range expected to be encountered in the particular profiling operation.

After calibration is complete, the system may be utilized to profile the cylinders. In use the calibrated measuring head 12 is inserted into a cylinder of the block 10. The clamping button 30 is depressed to activate the clamping jaws and the supports are retracted as previously mentioned. The transducers are now in contact with the walls of the cylinder and are operative to generate a profiling signal. Activation of the keyboard will sample and process the signal at a given time. It should be appreciated that the signal represents data which may be processed in various ways, such methods of processing being limited only by the program within the computer 16. In general though the transducer signals are compared with information in the signal processor relating to the profile of an "ideal" cylinder, that is to say a cylinder of perfect dimensions. The previously determined calibration factors are applied to the reading from the transducers and a signal indicative of the true profile of the cylinder is generated. This signal may be displayed in various formats. Referring now to FIG. 6 there is shown one mode for display of a profiling signal. FIG. 6 is a representation of one possible screen display illustrating in outline form the true profile of a cylinder. As will be noted the shape of the cylinder deviates from an ideal cylinder insofar as it is slightly barrel shaped and tapered. It should also be noted that the deviation of the FIG. 6 cylinder is greatly exaggerated to facilitate such visualization. The computer screen display for the representation in FIG. 6 would appear as:

---
Test Results for Finish 4 Cylinder - 3907035 - Bore 1   Date   Time
X 80 degrees Z 360 degrees Exaggeration 2000   Max   ● Min   Zero
---

The topmost line of the display bears a legend indicating that this is a test for a finish 4 cylinder and a particular test number is given thereafter. This corresponds to information input in response to computer prompts. The legend further indicates that this is bore 1, (i.e., the first measured) and includes blanks for the date and time of the measurement. The second line lists X and Z coordinates indicating the spatial orientation of the cylinder. The X coordinate indicates tilt of the cylinder about its longitudinal axis and as indicated, the cylinder is oriented at 80° to the horizontal and hence is tipped slightly forward in FIG. 6. The exaggeration factor is 2000 and indicates that this is the magnitude of the distortion of deviation. The open circle labeled "Max" at the top of the display corresponds to a point on the cylinder having maximum deviation from ideal cylindricity. The solid circle labeled "Min" indicates the point at which the minium deviation is encountered whereas the crossed circle labeled "zero" indicates a zero deviation point.

Referring now to FIG. 7, there is shown an alternate display of the same data for the same cylinder. The computer screen display for this representation would appear as:

---
Test Results for Finish 4 Cylinder - 3907035 - Bore 1   Date   Time
X 0 degrees Z 270 degrees Exaggeration 2000   Max   ● Min   Zero
---

In this instance the cylinder is rotated about the axis so that it is being viewed end on and in this regard the X coordinate is 0°. The Z coordinate is at 270° and it will be noted that the cylinder is rotated by 90° about its longitudinal axis as compared with the FIG. 6 cylinder. Exaggeration is still 2000 and the maximum, minimum, and zero points are in the same relative locations. Comparison of FIG. 6 and FIG. 7, particularly with reference to the maximum, minimum and zero points indicates the change in orientation. It will be appreciated that by appropriate use of software, the signal may be processed to allow for real time rotation of the cylinder display as well as for other types of processing.

After a reading is complete, the clamping jaws are withdrawn and the measuring head is removed and placed into a subsequent cylinder for subsequent readings.

Data generated through the use of the present invention may be processed in many other ways. For example, a plurality of readings may be stored within the computer and utilized to generate statistical information regarding overall quality of production. This data may be displayed in conventionally known histogram form. Alternatively data may be accumulated relating to particular factors such as maximum radius, minimum radius, taper, cylindricity and straightness and such data may be processed to indicate maximum and minimum values for such factors for a given group of cylinders, a single cylinder, a production run of cylinders, a group of cylinders manufactured by the use of a particular set of tooling or any other such criteria.

Data may also be accumulated and/or displayed in strictly numerical form as for example in measurements of enumerated parameters for an enumerated cylinder or enumerated parameters for a group of cylinders manufactured on a given day, or by a particular machine, as well as any other such criterion. It should thus be appreciated that the present invention is capable of providing fast, accurate and reproducable data and this data may be employed in various matters, limited only by the skill of a programmer in formulating and adapting well known programming techniques to the processing of such data.

While the system is amenable to various modes of operation, dependent only upon the software program employed to process the data generated by the transducer; it has been found most expedient to employ a menu-driven software package to implement the system. Use of a menu-driven system simplifies operation and reduces the level of skill required of the operator, by providing prompts and directional message which guide the operation of the system. Through the use of appropriate software, the system can be made self-diagnostic; that is to say, it can detect and indicate malfunctions in the transducers, computer or other hardware.

As is well known to those of skill in the electronic arts, the software of this system can be provided with several operating levels of security. For example, at a basic operational level, the operator may be provided with options for inputting parameters such as time, date, part number and so forth; while at higher security levels accessed by particular code words, parameters as such as data format and the like may be reset. At the highest security level, the basic program itself may be altered. These and other refinements of the software will be apparent to one of skill in the art, in light of the foregoing.

It will thus be apparent that there may are many variations and modifications of the herein disclosed invention. The foregoing drawings, descriptions and discussion are merely meant to illustrate particular embodiments of the invention, and are not intended as limitations upon the practice thereof. It is the following claims, including all equivalents which are meant to define the invention.

I claim:

1. An automatic cylinder profiling gage comprising:
   I. a generally cylindrical measuring head adapted to fit into a cylinder being profiled and including;
      centering means for maintaining the head in an approximately centered relationship within the interior of the cylinder,
      a plurality of transducers associated with the head, each transducer including a measuring probe extensible from the surface of the head and adapted to generate a positional signal corresponding to the distance from the head to the interior wall of the cylinder without deforming the interior wall of the cylinder, said transducers disposed in spaced apart relationship so as to substantially simultaneously contact a plurality of points along the length and circumference of said interior wall and substantially simultaneously generate a plurality of positional signals;

II. a signal processor disposed so as to receive the positional signals from the plurality of transducers, compare said signals with stored values corresponding to positional signals obtained from an ideal cylinder and generate a profile signal indicative of the deviation of the measured cylinder from the ideal cylinder; and III. display means in operative communication with the signal processor and adapted to receive the profile signal and provide a visual display corresponding thereto.

2. A gage as in claim 1 wherein said transducers are arrayed in a plurality of levels spaced along the length of the cylindrical measuring head, each level including a plurality of circumferentially spaced transducers.

3. A gage as in claim 2, wherein said head includes forty transducers arrayed in five levels, each level including eight transducers disposed in forty-five degree increments about the circumference of the head.

4. A gage as in claim 1, wherein said transducers are linear variable displacement transducers.

5. A gage as in claim 1, wherein said transducers are adapted to generate a positional signal having an accuracy of at least 0.1 micron.

6. A gage as in claim 1, wherein said head further includes clamping means adapted to contact the interior circumference of the cylinder being measured and retain the head in centered relationship therewith.

7. A gage as in claim 6, wherein said clamping means comprises a pair of pneumatically activatable members adapted to engage said interior circumference.

8. A gage as in claim 1, wherein said processor is adapted to analyze the profile signal and further compute at least one property of the cylinder from the group consisting of: maximum radius, minimum radius, taper, cylindricity and straightness.

9. A gage as in claim 1, wherein said signal processor is further adapted to store the profile signal for a series of measurements made upon a series of cylinders and provide a statistical analysis of said measurements.

10. A gage as in claim 1, wherein said display is adapted to receive the profile signal and provide a visual representation of a cylinder having a profile corresponding to the profile of the measured cylinder.

11. A gage as in claim 10, wherein said display is adapted to provide a visual display of the profile of the measured cylinder having the deviation thereof from the ideal cylinder exaggerated.

12. A gage as in claim 11, wherein the amount of said exaggeration may be varied.

13. A gage as in claim 10, wherein said display is further adapted to impose visual indicia upon said representation of the measured cylinder corresponding to the maximum deviation from the ideal cylinder, the minimum deviation from the ideal cylinder, and zero deviation from the ideal cylinder.

14. A gage as in claim 1, wherein said display is adapted to provide a numerical display of the profile signal.

15. A gage as in claim 14, wherein said numerical display provides indication of the deviation from the stored values of an ideal cylinder measured by each of the transducers.

16. A gage as in claim 9, wherein said display is further adapted to provide a numerical display of the statistical analysis performed by the processor.

17. A gage as in claim 1, wherein said signal processor is further adapted to control the operational sequence and parameters of the gage and the display is adapted to provide operator-readable prompt messages whereby the gage is adapted to operate in a menu-driven mode.

18. A gage as in claim 1, further including at least one calibration cylinder having a predetermined profile; and wherein said signal processor has stored therewithin a calibration signal corresponding to the profile of the calibration cylinder; whereby the profiling gage may be calibrated by placing the measuring head in the calibration cylinder, generating a profiling signal therefrom and comparing the profiling signal with the stored calibration signal.

19. A method for automatically profiling a cylinder, said method comprising:

providing a generally cylindrical measuring head adapted to fit into a cylinder being profiled said head including a plurality of transducers associated therewith, each transducer including a measuring probe extensible from the surface of the head and adapted to generate a positional signal corresponding from the distance from the head to the interior wall of the cylinder without deforming the interior wall of the cylinder, said transducers are disposed in spaced apart relationship so as to substantially simultaneously contact a plurality of points along the length and circumference of the interior wall;

centering the measuring head in an approximately centered relationship within the interior of the cylinder;

activating the transducers to generate said positional signal;

comparing said positional signals with a corresponding signal obtained from an ideal cylinder and generating a profile signal indicative of the deviation of the measured cylinder from the ideal cylinder; and displaying the profile signal in visual form.

* * * * *